United States Patent [19]

Bombola

[11] 3,885,062

[45] May 20, 1975

[54] PROCESS FOR TREATING MOLDS USED IN MOLDING GLASS PARTS

[75] Inventor: Frank Bombola, Garden Grove, Calif.

[73] Assignee: E/M Lubricants, Inc., West Lafayette, Ind.

[22] Filed: May 17, 1973

[21] Appl. No.: 361,343

[52] U.S. Cl. .................. 427/133; 65/24; 65/26; 106/38.27
[51] Int. Cl. ............................................. B29c 1/04
[58] Field of Search ............... 65/24, 26; 106/38.27; 117/5.1, 5.3, 160 R, 160 A, 169 R

[56] References Cited
UNITED STATES PATENTS

| | | | |
|---|---|---|---|
| 2,685,539 | 8/1954 | Woodburn et al. | 117/5.1 |
| 3,396,935 | 8/1968 | Snyder | 117/5.3 |
| 3,637,412 | 1/1972 | Felice et al. | 117/5.3 |
| 3,702,774 | 11/1972 | Birchall et al. | 117/5.1 |
| 3,783,013 | 1/1974 | Seeman | 117/5.3 |

*Primary Examiner*—William D. Martin
*Assistant Examiner*—Dennis C. Konopacki
*Attorney, Agent, or Firm*—Kirkland & Ellis

[57] ABSTRACT

Periodic application of a composition comprising monoaluminum dihydrogen phosphate, $AL(H_2PO_4)_3$, as a binder and an anti-wear agent such as finely divided hard metals, solid lubricants or the like to clean surfaces of molds used in manufacturing glass parts facilitates quick release of molded glass parts from the mold, provides a protective coating for the mold surfaces, and eliminates the necessity for frequency swabbing of the mold with oily compositions.

9 Claims, No Drawings

“3,885,062”

PROCESS FOR TREATING MOLDS USED IN MOLDING GLASS PARTS

BACKGROUND OF THE INVENTION

1. Field of the Invention

The present invention relates to the treatment and maintenance of molds used in manufacturing glass parts and more particularly relates to the application of a composition comprising monoaluminum dihydrogen phosphate, $Al(H_2PO_4)_3$, as a binder and an anti-wear agent such as solid lubricant, finely divided hard metal, or the like to the surfaces of such a mold to enhance the quick release of a molded glass part therefrom and to protect the mold.

2. Description of the Prior Art

In accordance with the conventional techniques employed in molding glass parts such as bottles, jars, and the like, the mold surface is frequently treated with a release by a process known as swabbing. In accordance with swabbing techniques, a swabbing composition, comprising a mineral oil carrier and a lubricant such as sulphur and/or graphite, is brushed into the glass forming equipment about every five to forty-five minutes. The swabbing compound is brushed into the mold to allow the molded glass part to be released from the mold without any marks on it and also to preserve the mold against deterioration during the molding process.

Numerous disadvantages have been encountered in using such swabbbing techniques. First, in accordance with the conventional swabbing method, the mold must be polished before the swabbing compound is applied. Since such a polishing operation by its very nature involves the removal of metal from the mold, the useful life of the mold is necessarily reduced as the metal is gradually worn away.

In addition, because of the chemical composition of swabbing compounds, chemical reactions occur between the swabbing compounds, the base metal of the mold, and hot glass. Thus, when subjected to heat and exposed to oil, hot glass, sulphur and graphite, corrosive materials such as sulfuric and nitric acids are formed, and these acids attack the exposed metals of the mold and other equipment.

Furthermore, because of the manual brushing techniques employed in applying swabbing compounds to glass molds, an uneven coating of the swabbing compound is applied. As a result, during the molding operation temperature gradients are set up due to the uneven thickness of the swabbing compound, thereby resulting in the production of defective glass parts. The build-up of swabbing compounds in the molding equipment further results in the production of out of specification glass parts because of improper mold dimensions. The use of oily swabbing compounds frequently results in molded parts of unsightly, discolored glass which must also be rejected.

Finally, the use of oily swabbing compounds results in the production of significant amounts of smoke due to the heat at which the glass molds are operated. As a result, conventional oil swabbing techniques pose significant compliance problems under air pollution control regulations.

In accordance with the present invention, a new technique for treating molds employed in manufacturing glass parts permits the molded glass part to be quickly released and provides virtually complete protection for the mold surface while avoiding the foregoing disadvantages prior art swabbing technique.

Accordingly, it is a primary object of the present invention to provide a new method for treating glass manufacturing molds.

A related object is to provide compositions for use in accordance with such process.

A further object is to provide a method for treating molds used in manufacturing glass parts which avoids the disadvantages of the prior art swabbing techniques.

SUMMARY OF THE INVENTION

The foregoing and other objects, advantages, and features of the present invention may be obtained with this invention, which relates to a process for treating molds adapted for use in molding glass parts comprising the steps of first cleaning the surface of such molds, and thereafter applying to the mold surfaces an aqueous composition comprising monoaluminum dihydrogen phosphate, $Al(H_2PO_4)_3$, and an anti-wear agent such as finely divided hard metals, solid lubricants or the like, whereby a sacrificial protective coating is provided on the mold surfaces in order to facilitate release of the molded glass part while at the same time protecting the surface of the mold.

DETAILED DESCRIPTION OF THE PREFERRED EMBODIMENTS

This invention relates to a process for treating molds adapted for use in molding glass parts and to compositions for use therewith. The method comprises the steps of cleaning the surface of such molds, and thereafter applying to the mold surfaces an aqueous composition comprising monoaluminum dihydrogen phosphate, $Al(H_2PO_4)_3$, and an anti-wear agent in order to provide a sacrificial protective coating on the mold surfaces.

The anti-wear component of the compositions of the invention may be a solid lubricant such as graphite, carbon black, molybdenum disulfide, tungsten disulfide, molybdenum diselenide, molybdenum telluride, iron oxide, boron nitride, lead sulfide and mixtures thereof. Graphite is the preferred solid lubricant in accordance with this invention.

The size of the solid lubricant particles is not critical although they are generally finely divided. Two preferred graphites used with this invention have particles in the range of about 0.05 micron and about 325 mesh, respectively. Mixtures of these graphites may be advantageously employed.

Alternatively, finely divided powdered metals may be employed as the anti-wear agent. Suitable hard metals include, molybdenum, tungsten, and chromium and their carbides such as tungsten carbide. Mixtures of hard metals and solid lubricants may also be employed.

The monoaluminum dihydrogen phosphate, $Al(H_2PO_4)_3$, in the aqueous medium of this invention is believed to contain all of its various dissociation species. An exemplary method of obtaining the aqueous monoaluminum dihydrogen phosphate is given in the following example.

EXAMPLE I

Aluminum oxide tri-hydrate, $Al_2O_3 \cdot 3H_2O$, is mixed with orthophosphoric acid, $H_3PO_4$ and diluted with water to a pH of 2.8–2.9 in order to obtain an aqueous composition analyzing about 7.4–8.5% $Al_2O_5$ and about 32–35% $P_2O_5$.

Preferably, the aqueous compositions of this invention contain a mixture of a monoaluminum dihydrogen phosphate and anti-wear agent lying in the weight ratio range of about 1 to about 25 parts by weight monoaluminum dihydrogen phosphate to about 75 to about 1 parts by weight anti-wear agent. Thus, such mixtures comprise about 1% up to about 96% monoaluminum dihydrogen phosphate and balance (i.e., about 99 to about 4%) anti-wear agent.

The mixture of monoaluminum dihydrogen phosphate and anti-wear is in turn provided in an aqueous carrier comprising about 0.25 to about 2.5 parts by weight of such mixture to about 6 parts by weight water (i.e., the aqueous composition should comprise about 4–25% of the mixture by weight of the composition). Preferably, the aqueous composition comprises about 10 – 15% of the mixture of monoaluminum dihydrogen phosphate and solid lubricant by weight.

The following Examples provide preferred compositions in accordance with this invention.

EXAMPLE II

| Constituent | Parts by Weight |
| --- | --- |
| Monoaluminum dihydrogen phosphate | 24 |
| Graphite | 5 |
| Water | 168 |

EXAMPLE III

| Constituent | Parts by Weight |
| --- | --- |
| Monoaluminum dihydrogen phosphate | 24 |
| Lead sulfide | 0.5 |
| Carbon black | 1.5 |
| Graphite | 3 |
| Water | 168 |

EXAMPLE IV

| Constituent | Parts by Weight |
| --- | --- |
| Monaluminum dihydrogen phosphate | 24 |
| Tungsten diselenide | 4 |
| Water | 160 |

EXAMPLE V

| Constituent | Parts by Weight |
| --- | --- |
| Monoaluminum dihydrogen phosphate | 20 |
| Molybdenum | 0.5 |
| Graphite | 4.5 |
| Water | 168 |

EXAMPLE VI

| Constituent | Parts by Weight |
| --- | --- |
| Monoaluminum dihydrogen phosphate | 24 |
| Tungsten Carbide | 5.0 |
| Water | 170 |

EXAMPLE VII

| Constituent | Parts by Weight |
| --- | --- |
| Monoaluminum dihydrogen phosphate | 30 |
| Chromium | 0.5 |
| Graphite | 4.5 |
| Water | 150 |

In accordance with the process of this invention, a mold part designed to be treated is first thoroughly cleaned by the use of known blasting techniques such as glass bead or aluminum oxide blasting in order to provide a clean surface that is free from foreign matter and has a slightly or semi-roughened texture. The mold surface need not be polished after the blasting step as is required in conventional swabbing techniques.

Preferably, the composition is applied to the mold surface so as to provide a coating having a thickness ranging from about 0.0001 inch to about 0.050 inch, depending upon the frequency with which it is desired to recoat the mold surface. A preferred method is to apply approximately ten coats of the composition to build up a thickness approximating 0.002 inch.

While it is preferred to apply the aqueous solutions of this invention by spraying because of the uniformity of the coating produced, the composition can be applied to the mold in substantially any other manner (e.g., dipping, brushing, rolling, and the like) so long as a substantially uniform coating of the desired thickness is obtained.

Although the coating compositions and methods of this invention have as their prime utility the treatment of the surfaces of molds employed in molding glass parts, they can advantageously be employed to treat all metal surfaces of glass forming equipment. Thus, auxilliary devices as blanks, baffles, funnels, bottom plates, neck rings as well as finished molds themselves may be treated. Thus, as used herein, "mold surfaces" should be understood to refer to and encompass all such glass manufacturing equipment.

Glass mold surfaces treated in accordance with the present method need only be treated every 24 to 72 hours (in contrast to the every 5 to 45 minute swabbings of the prior art), thereby greatly increasing glass molding productivity. Moreover, the frequency of coating may be governed by the thickness of the coating applied, so that efficient production scheduling can be planned and maintained.

As noted, the composition in accordance with this invention is applied in aqueous solution form. An important advantage of this process resides in the fact that mineral and other oils and other smoke producing materials are not utilized. Thus, the noxious smoke given off by the prior art swabbing compounds is not obtained with the process of this invention even when the molds are heated to their 600°–1,000°F. operating temperatures.

Without being limited to the theory by which present process achieves its novel results, it is believed that the aqueous monoaluminum dihydrogen phosphate containing compositions of this invention have in complex equilibrium each of the various dissociation species of $Al(H_2PO_4)_3$, and their various dissociation and association species, together with finely divided solid particles of lubricant or hard metal ranging in size from dust like to granular. It is believed that the fine anti-wear agent particles are chemically bonded to each other and to the metal substrate surface of the mold by the monoaluminum dihydrogen phosphate binder.

Since the breakdown and sacrificial deterioration of the protective coating provided by this invention is predictable, molds may be recoated on a predictable basis so that the glass manufacturing process can be systemetized in contrast to the irregular nature of the application of swabbing techniques of the prior art. Moreover, use of the coatings and processes of this invention not only permits molded glass parts to be released from the molding equipment in the desired manner, but also provides the desired level of protection of the molding equipment. Since the mold surfaces need only be cleaned before the coating is applied (i.e., the polishing step of the prior art swabbing method, which actually wears away the mold surface, is not required), mold life is greatly enhanced.

Since the coatings of this invention are of uniform thickness, the molded glass parts can be produced to specification more easily and fewer glass parts are rejected.

The coatings of ths invention protect the mold surfaces, and intimate contact between hot glass and bare metal does not occur, and the galling and scaling produced by the contact of hot glass and bare metal under the prior art is avoided thereby further adding to the useful life of the molding equipment.

I claim:

1. A process for treating molds adapted for use in molding glass parts comprising the steps of:
   cleaning the surfaces of such molds; and
   thereafter, applying to said mold surfaces an aqueous composition comprising a mixture of monoaluminum dihydrogen phosphate, $Al(H_2PO_4)_3$, and a member selected from the group consisting of graphite, carbon black, molybdenum disulfide, tungsten disulfide, molybdenum diselenide, molybdenum telluride, iron oxide, lead sulfide and molybdenum, tungsten, chromium, and carbides thereof, and mixtures thereof,
   whereby a sacrificial protective coating is provided on the mold surfaces thereby facilitating release of molded glass parts and protecting the surface of the mold.

2. A this as claimed in claim 1, wherein the composition applied to the surface of the mold has a substantially uniform thickness.

3. A process, as claimed in claim 2, wherein the thickness of the composition lies in the range of about 0.0001 to about 0.05 inch.

4. A process, as claimed in claim 1, wherein the mixture comprises about 1–75 parts by weight monoaluminum dihydrogen phosphate and about 25–1 parts by weight of said member.

5. A process, as claimed in claim 1, wherein the aqueous composition is applied by spraying.

6. A process as claimed in claim 1, wherein said member is graphite.

7. A process, as claimed in claim 1, wherein the mold surfaces are cleaned by glass bead blasting or aluminum oxide blasting.

8. A process, as claimed in claim 1, wherein molds are treated by said process no more frequently than about once every 24 to 72 hours.

9. A process, as claimed in claim 1, wherein the said mixture is present in the aqueous composition at a level of about 4 to 25% by weight of the composition.

* * * * *